(12) United States Patent
Blumer et al.

(10) Patent No.: US 6,348,978 B1
(45) Date of Patent: Feb. 19, 2002

(54) METHOD AND SYSTEM FOR IMAGE FORMAT CONVERSION

(75) Inventors: Marc Blumer; Dan Avida, both of Belmont, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 08/900,085

(22) Filed: Jul. 24, 1997

(51) Int. Cl.[7] .............................. B41J 15/00; G03F 3/08
(52) U.S. Cl. .................... 358/1.9; 358/1.2; 358/1.16; 358/1.7; 358/523
(58) Field of Search .................. 395/109, 115, 395/116; 358/523, 261.4, 460, 1.2, 1.9, 1.16, 1.172, 261.11; 345/507, 521, 515, 509, 517, 508, 443, 516

(56) References Cited

U.S. PATENT DOCUMENTS

| | | | |
|---|---|---|---|
| 4,058,828 A | 11/1977 | Ladd | 358/80 |
| 4,914,622 A | 4/1990 | Sfarti et al. | 364/900 |
| 4,953,104 A | 8/1990 | Yeh et al. | 364/519 |
| 4,983,958 A | 1/1991 | Carrick | 340/799 |
| 5,005,011 A | 4/1991 | Perlman et al. | 340/728 |
| 5,046,023 A * | 9/1991 | Katsura et al. | 345/443 |
| 5,162,788 A | 11/1992 | Lundblad et al. | 340/799 |
| 5,168,552 A | 12/1992 | Vaughn et al. | 315/109 |
| 5,269,003 A | 12/1993 | Roskowski et al. | 395/166 |
| 5,440,329 A * | 8/1995 | Meggitt et al. | 347/212 |
| 5,452,235 A | 9/1995 | Isani | 364/514 |
| 5,521,711 A * | 5/1996 | Onodera | 358/300 |
| 5,768,481 A * | 6/1998 | Chan et al. | 358/1.2 |

FOREIGN PATENT DOCUMENTS

WO    WO 88/00751    1/1988    ............ G09G/1/16

* cited by examiner

Primary Examiner—Edward Coles
Assistant Examiner—Twyler Lamb
(74) Attorney, Agent, or Firm—Michael A. Glenn (57) ABSTRACT

A method and system are provided for converting image data between planar format and a chunky format. A barrel shifter sorts the image bytes by color plane for output to a plurality of memory cells. Two addresses of each memory cell are not interconnected and function as a set of selection lines, whose binary values determine the number of positions that the data stored in the memory cells are shifted in response to the action of the barrel shifter. The sorted bytes are stored according to color format in the remaining, interconnected addresses of the memory cells. When the barrel shifter does not shift the bytes in a word, cyan bytes are stored in the memory cells. When the barrel shifter shifts the word one byte position, magenta bytes are output to the memory cells. Yellow and black bytes, respectively, are output for shifts of two bytes and three bytes, respectively. Each color plane is therefore stored in a separate memory cell and the chunky format data are converted to a planar format. This planar data may then be output to a printer. Further, the invention is bidirectionally operative. Thus, color-sorted bytes in planar format may be input to the barrel shifter and sorted to output the image data in chunky format.

19 Claims, 8 Drawing Sheets

| | | | |
|---|---|---|---|
| C0 | M0 | Y0 | K0 |
| C1 | M1 | Y1 | K1 |
| C2 | M2 | Y2 | K2 |
| C3 | M3 | Y3 | K3 |

*FIG. 1*
(PRIOR ART)

| | | | |
|---|---|---|---|
| C0 | C1 | C2 | C3 |
| C4 | C5 | C6 | C7 |
| | | | Cn |

| | | | |
|---|---|---|---|
| M0 | M1 | M2 | M3 |
| M4 | M5 | M6 | M7 |
| | | | Mn |

| | | | |
|---|---|---|---|
| Y0 | Y1 | Y2 | Y3 |
| Y4 | Y5 | Y6 | Y7 |
| | | | Yn |

| | | | |
|---|---|---|---|
| K0 | K1 | K2 | K3 |
| K4 | K5 | K6 | K7 |
| | | | Kn |

METHOD AND SYSTEM FOR IMAGE FORMAT CONVERSION

BACKGROUND OF THE INVENTION

1. Technical Field

The invention relates to image processing. More particularly, the invention relates to a method and system for converting image data, for example, between a bitplane (planar) format and a CMYK (chunky) format.

2. Description of the Prior Art

Computer images are arranged as a grid of pixels in which each pixel is stored in memory as a numerical representation of the pixel's attributes, such as color and intensity. Several different color models are currently being used to define such colors mathematically.

The RGB model, representing the three primary colors red, green, and blue, is an additive model. RGB is used in most computer monitors, scanners, televisions, graphics cards, and lighting effects. The CMYK model is a subtractive system, based on the absorption of ink and paint into paper. Most printers use the CMYK model.

Because most computers and scanners use RGB, and most printers use CMYK, a conversion process, also referred to as rendering, must be used to print an image in CMYK that is displayed on a computer screen in RGB. This conversion may be performed in the user's computer, in the scanner, or in the printer. An example of a software application for RGB to CMYK conversion in a computer is Photoshop, by Adobe Systems. After the image is converted, it is then saved as a CMYK version and may be output to the printer as desired. Rendered images may be stored in different formats in a computer's memory. Two such formats are bitplane (planar) and CMYK (chunky) formats.

Figure 1:
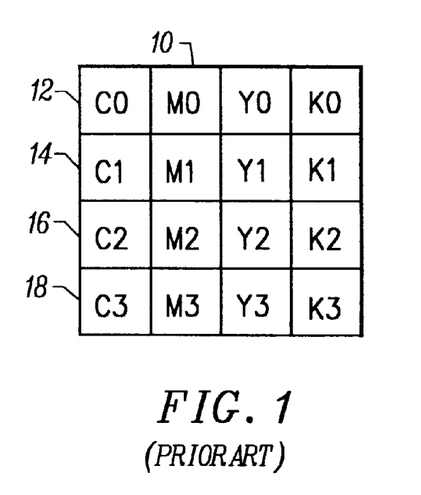
FIG. 1 is an illustration of a portion of an image arranged in a chunky data format.

FIG. 1 is an illustration of a portion of an image 10 that is arranged in a chunky data format. In chunky data format, the data for each pixel are stored as "chunks." Each word 12, 14, 16, 18 corresponds to one pixel in the image and includes one byte for each of four color planes. For example, the first word 12 includes a cyan byte $C_0$, a magenta byte $M_0$, a yellow byte $Y_0$, and a black byte $K_0$. In the FIG. 1, the bytes are incremented from left to right in a word, and from top to bottom to provide a group of words.

Chunky format is very efficient when rendering an image because a processor only needs to perform a single word write operation to store the pixel in memory once it has generated the pixel.

Image files generally contain large quantities of data. Overall system performance can be significantly affected when transferring such large image files. It is therefore of critical importance to conserve bandwidth in the image transfer process. Chunky data are readily transmitted quickly and efficiently over a system bus, for example, a PCI bus. Thus, once the image has been rendered in a frame buffer, it can be rapidly transmitted to a printer because the data can be sent as discrete chunks and reassembled at the printer to produce the image. However, chunky data are not processed as efficiently by the printer as are planar data.

A typical color laser printer has one drum upon which an image is formed during an electrostatic dye transfer process. Such printer prints CMYK color planes in four passes and therefore can only accept one color separation at a time. Because each pixel typically includes data for all four color planes when in chunky format, the printer must access the storage memory multiple times to print the image. For example, when a pixel is transmitted to the printer, the printer must discard all data in the word that comprises the pixel except for data relating to the specific color plane that is currently being printed. Thus, up to three-quarters of all data is discarded for each pixel that is printed, and each word must be transferred to the printer four separate times to print a full-color image.

For example, an A4 page having a resolution of 400 dots per inch (dpi) can be stored in approximately 60 megabytes (MB) of memory. However, if the data are stored in chunky format, the printer must access memory four times per pixel, i.e. one for each of the CMYK color planes. The printer first accesses the data to print one color plane, and discards all of the data for each such access that are not concerned with the color plane currently being printed. Thus, 240 MB (60 MB×4) of memory is being transferred to print the same A4 page when the data are arranged in a chunky format. This larger memory transfer can slow system performance and printing.

Figure 2:
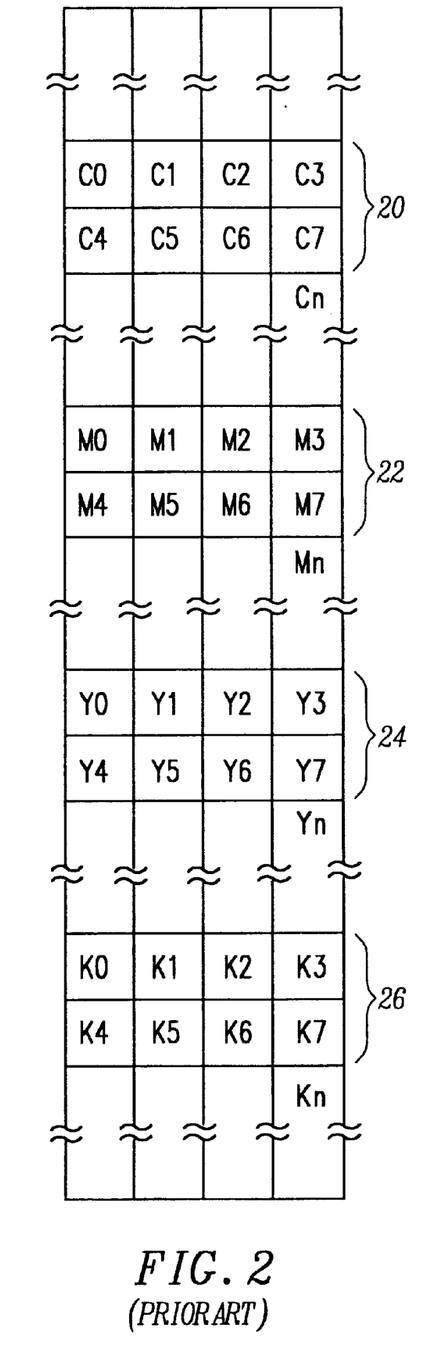
FIG. 2 is an illustration of a portion of an image arranged in a planar data format.

FIG. 2 is an illustration of a portion of an image 10 that is arranged in a planar data format. In the planar format, the image is represented by several overlaying color planes 20, 22, 24, 26 of data. Thus, in a CMYK image, each pixel is separated by color. For example, all cyan information $C_0$, $C_1$, $C_2$–$C_n$ is combined into a cyan pixel plane. Magenta information $M_0$–$M_n$, yellow information $Y_0$–$Y_n$, and black information $B_0$–$B_n$ is combined into separate pixel planes.

In the planar format, pixel data for each color are stored in a separate section of the memory, or in a separate buffer. A four-pass printer separately prints the contents of each buffer to reproduce the color image. The planar format is therefore very efficient when used in printing. In contrast to the previous example concerning chunky format, the four memory buffers are accessed one time each in planar format, without discarding color data. Thus, only 60 MB of memory is required to transfer and print the same A4 image in a planar format.

However, planar format is not used to advantage in the rendering process, because the processor must perform four write operations for each pixel rendered to store the pixel in memory. This is due to the fact that the processor must access all four memory buffers to obtain the data necessary to complete all four color planes, e.g. in a CMYK image. The time required to render an image where the data are arranged in a planar format can be approximately 30 percent greater than the time required to render the image where the data are arranged in a chunky format. Therefore, a planar format is not as efficient for rendering an image as a chunky format.

It is known in the prior art to use software to convert between a chunky format and a planar format. However, such software conversion techniques are both memory and time consuming. For example, data stored in planar format at a printer are not transferred as efficiently as data stored in chunky format data.

There has therefore been a need for an improved method for converting between chunky and planar formats. It would therefore be an advantage to provide a method and system for converting between a planar format and a chunky data format. It would be yet another advantage if the method and system were able to convert between these formats bidirectionally.

SUMMARY OF THE INVENTION

The invention provides a method and system for converting image data between a chunky format and a planar format. In the preferred embodiment of the invention, an image is initially rendered from RGB data to CMYK data and stored in memory in a chunky format. A barrel shifter is used to sort each byte of the image by color plane. The barrel shifter separates the bytes by color plane and outputs the sorted bytes in a planar format. In the preferred embodiment of the invention, the barrel shifter may be constructed as part of an application specific integrated circuit (ASIC) that interfaces a processor to the system memory.

The invention preferably includes a plurality of memory cells that store the color sorted bytes. The memory cells are partially interconnected, although two addresses of each memory cell are not connected in common with any of the other memory cells. The non-interconnected addresses function as a set of selection lines, whose binary values determine the number of positions that the data stored in the memory are to be shifted.

The invention includes a circuit that obtains an address for the first pixel of the chunky data in an image. The processor sends this first word via a processor interface to the circuit. If no offset is needed, the barrel shifter does not shift the word which represents the first pixel. The pixel is therefore separated into four bytes and each byte is stored by color plane in a corresponding one of the memory cells.

The second pixel of the image has an address with an offset of +1 word (+4 bytes). The barrel shifter shifts each of the bytes within the word by one position, thereafter transferring each of the bytes into respective memory cells. The barrel shifter shifts each of the bytes in the third word by two positions, and each of the bytes in the fourth word by three positions. The four bytes of each word are thereby separated into each of the respective CMYK color planes and stored in corresponding memory cells by color planes as appropriate. The process then repeats for the next pixels in the image.

Thus, the first memory cell contains, e.g. a cyan byte from each word, the second memory cell contains a magenta byte from each word, the third memory cell contains a yellow byte from each word, and the fourth memory cell contains a black byte from each word. Thus, the chunky format data have been converted to planar data as stored in the respective memory cells. This planar data may then be output to a printer, e.g. for four pass printing. The invention therefore provides a technique that uses to advantage the more efficient chunky format while rendering an image, and the more efficient planar format during printing.

In an alternative embodiment of the invention, the invention is bidirectionally operative. Thus, bytes that have been sorted by color plane and that are therefore arranged in a planar format may be input to a barrel shifter to sort the bytes, and thereby produce image data in a chunky format.

DETAILED DESCRIPTION OF THE INVENTION

The invention provides a method and system for converting image data between a chunky format and a planar format. In the preferred embodiment of the invention, an image is initially rendered from RGB data (e.g. a scanned RGB image) to CMYK data and stored in computer memory in a chunky format.

Figure 3:
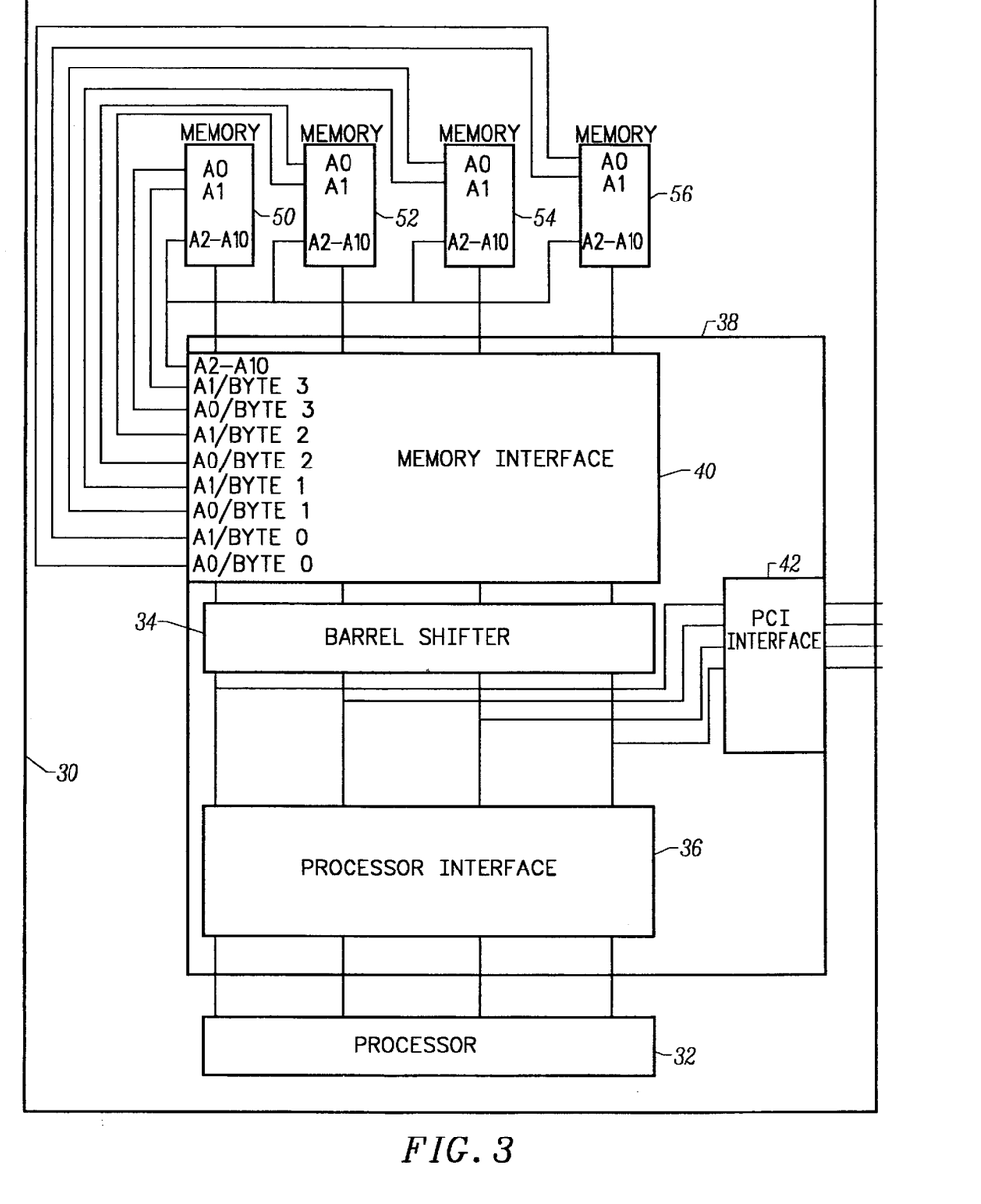
FIG. 3 is a schematic block diagram of the system for image format conversion according to the invention.

FIG. 3 is a block diagram of the system 30 for image format conversion, according to the invention. A processor 32 is connected to a barrel shifter 34 via a processor interface 36. A barrel shifter is a circuit that cyclically shifts input data by a number of positions dictated by the word address, i.e. the binary value of a set of selection lines.

In the preferred embodiment of the invention, the barrel shifter is constructed as part of an application specific integrated circuit (ASIC) 38 that interfaces the processor to the memory. The ASIC may also include memory interface 40 and a PCI bus interface 42. It should be appreciated that, while the preferred embodiment of the invention is discussed in connection with an ASIC, the actual hardware implementation of the invention is considered to be a matter of choice to one skilled in the art.

The barrel shifter is connected to four memory storage cells 50, 52, 54, 46, via a memory interface 40. In the preferred embodiment of the invention, the memory cells are dynamic random access memory (DRAMs), such as single in-line memory modules (SIMMS) or dual in-line memory modules (DIMMS).

The preferred embodiment is adapted for use with a four-byte barrel shifter having four associated memory storage cells, and therefore four lines joining the elements in the data bus. However, alternative embodiments of the invention are adapted for use with any appropriate number of memory cells and lines. Thus, the following discussion is provided for purposes of example and not as a limitation on the scope of the invention.

Figure 4:
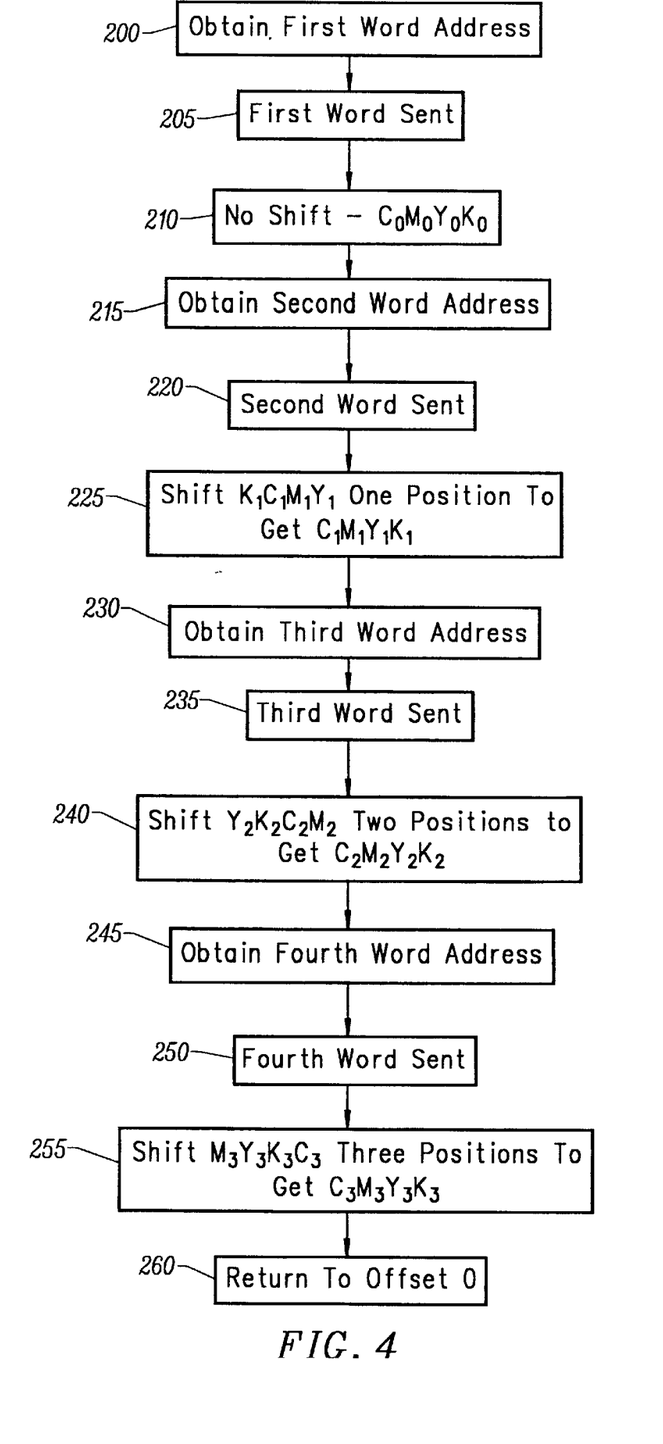
FIG. 4 is a flow chart illustrating a method for performing image format conversion according to the invention.

FIG. 4 is a flow chart illustrating one cycle of a method for image format conversion according to the invention. The circuit 38 in which the invention is implemented obtains the address for the first word (first pixel) 96 (FIG. 6) of the chunky data (200). In the example, this word address is offset 0. The processor 32 sends this first word via the processor interface 36 to the circuit 38 in which the invention is implemented (205). The barrel shifter 34 in the circuit 38 does not shift the word (210). The first word $C_0M_0Y_0K_0$ 92 is therefore separated into four bytes. Referring to FIG. 3, byte $C_0$ is transferred to memory cell 50, byte $M_0$ to memory cell 52, byte $Y_0$ to memory cell 54, and byte $K_0$ to memory cell 56.

The circuit then obtains the address for the second word (second pixel) 94 (FIG. 6) of the chunky data (215). In the example, this word address is offset +1 Word (+4 bytes). The processor 32 sends this second word 94 via the processor interface 36 to the circuit (220). The barrel shifter 34 shifts each of the bytes in the second word 94 one position (225). The second word $K_1C_1M_1Y_1$ 94 is therefore separated into four bytes, with byte $C_1$ transferred to memory cell 52, byte $M_1$ to memory cell 54, byte $Y_1$ to memory cell 56, and byte $K_1$ to memory cell 50.

The circuit 38 next obtains the address for the third word (third pixel) 96 (FIG. 6) of the chunky data (230), offset +2 Words (+8 bytes). The processor 32 sends this third word 96 via the processor interface 36 to the circuit 38, at step (235). The barrel shifter 34 shifts each byte in the third word 96 two positions (240). The third word $Y_2K_2C_2M_2$ 96 is separated into four bytes, with byte $C_2$ transferred to memory cell 54, byte $M_2$ to memory cell 56, byte $Y_2$ to memory cell 50 and byte $K_2$ to memory cell 52.

The circuit 38 then obtains the address for the fourth word (fourth pixel) 98 (FIG. 6) of the chunky data (245), offset +3 Words (+12 bytes). The processor 32 sends this fourth word 98 via the processor interface 36 to the circuit 38, at step (250). The barrel shifter 34 shifts each byte in the fourth word 98 three positions (255). The fourth word $C_3M_3Y_3K3$ 98 is separated into four bytes, with byte $C_3$ transferred to memory cell 56, byte $M_3$ to memory cell 50, byte $Y_3$ to memory cell 52, and byte $K_3$ to memory cell 54.

The next word address returns to offset 0 (260) and the process is repeated until all of the chunky data have been stored as planar data in the memory cells 50,52,54,56.

Figure 5:
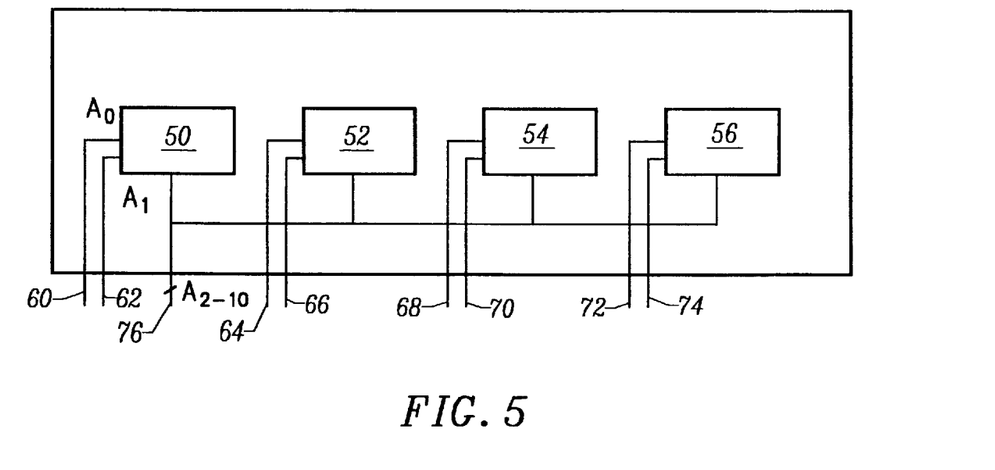
FIG. 5 is a block schematic diagram illustrating memory cell addressing according to the invention.

FIG. 5 is a diagram illustrating memory cell addressing according to the invention. In the preferred embodiment of the invention, the lowest two address lines, $A_0$ and $A_1$, of each memory cell 50, 52, 54, 56 are not interconnected with the address lines of any other memory cell. These "non-common" address lines function as a set of selection lines 60, 62, 64, 66, 68, 70, 72, 74 whose binary values determine the number of positions that the data to be stored in the memory cell are shifted. In this way, each byte in each color plane is stored in its proper position in relation to each other byte in the respective color plane. The remaining addresses 76, $A_2$ through $A_{10}$ in the example, are interconnected. These addresses are used to store the bytes of each word as they are output from the barrel shifter 34.

For example, the barrel shifter 34 does not shift the input data if the binary values (decimal equivalents are shown in parenthesis) stored in $A_0$ and $A_1$ of memory cells 50, 52, 54, and 56 are "00" (zero), "01" (one), "10" (two), and "11" (three), respectively. The barrel shifter 34 rotates the input data once if the stored binary values are "11" (three), "00" (zero), "01" (one), and "10" (two), respectively.

Table 1 is a function table for the four-byte barrel shifter 34 of the preferred embodiment of the invention.

TABLE 1

| Memory Cell: | 50 | 52 | 54 | 56 |
| --- | --- | --- | --- | --- |
| No shift | "00" (0) | "01" (1) | "10" (2) | "11" (3) |
| Rotate once | "11" (3) | "00" (0) | "01" (1) | "10" (2) |
| Rotate twice | "10" (2) | "11" (3) | "00" (0) | "01" (1) |
| Rotate three times | "01" (1) | "10" (2) | "11" (3) | "00" (0) |

The barrel shifter thereby sorts the input chunky format data by color plane to output planar format data. In the preferred embodiment of the invention, these data are output via the PCI interface 42 to a printer (not shown) via four lines 110,112,114,116 (FIG. 7–FIG. 10) of the PCI data bus.

Figure 6:
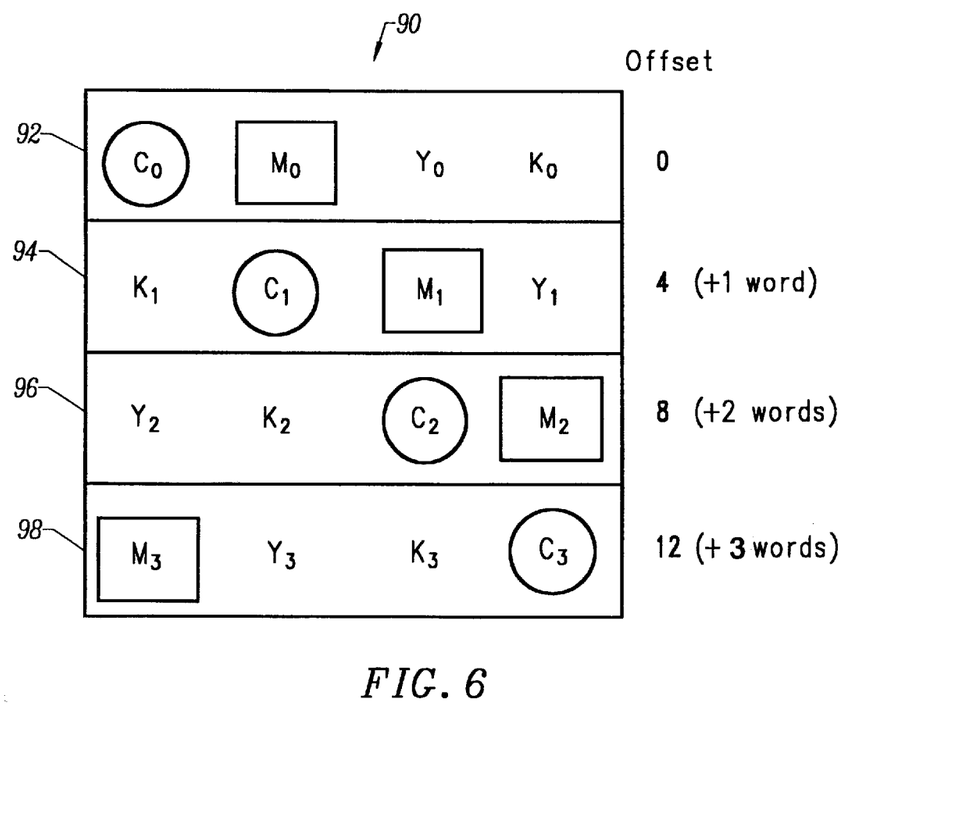
FIG. 6 is a diagram that shows color plane byte shifting for four pixels according to the invention.

FIG. 6 is a diagram that shows color plane byte shifting for four pixels according to the invention. In FIG. 6, a portion of an image 90 is stored in chunky format. Each word 92, 94, 96, 98 contains bytes for each of the four color planes. In the example shown, the bytes for each word are identified by a subscript. Thus, the magenta byte of the first word 92 is denoted $M_0$ and the magenta byte for the third word 96 is $M_2$.

In the preferred embodiment of the invention, the cyan bytes $C_0$, $C_1$, $C_3$, are separated when the input data are not shifted. The magenta bytes $M_0$, $M_1$, $M_2$, $M_3$, are separated next, followed by the yellow and black bytes. The separated bytes are then output from the barrel shifter 34. The barrel shifter 34 thus receives chunky data as an input, and outputs the data in planar format.

Figure 7:
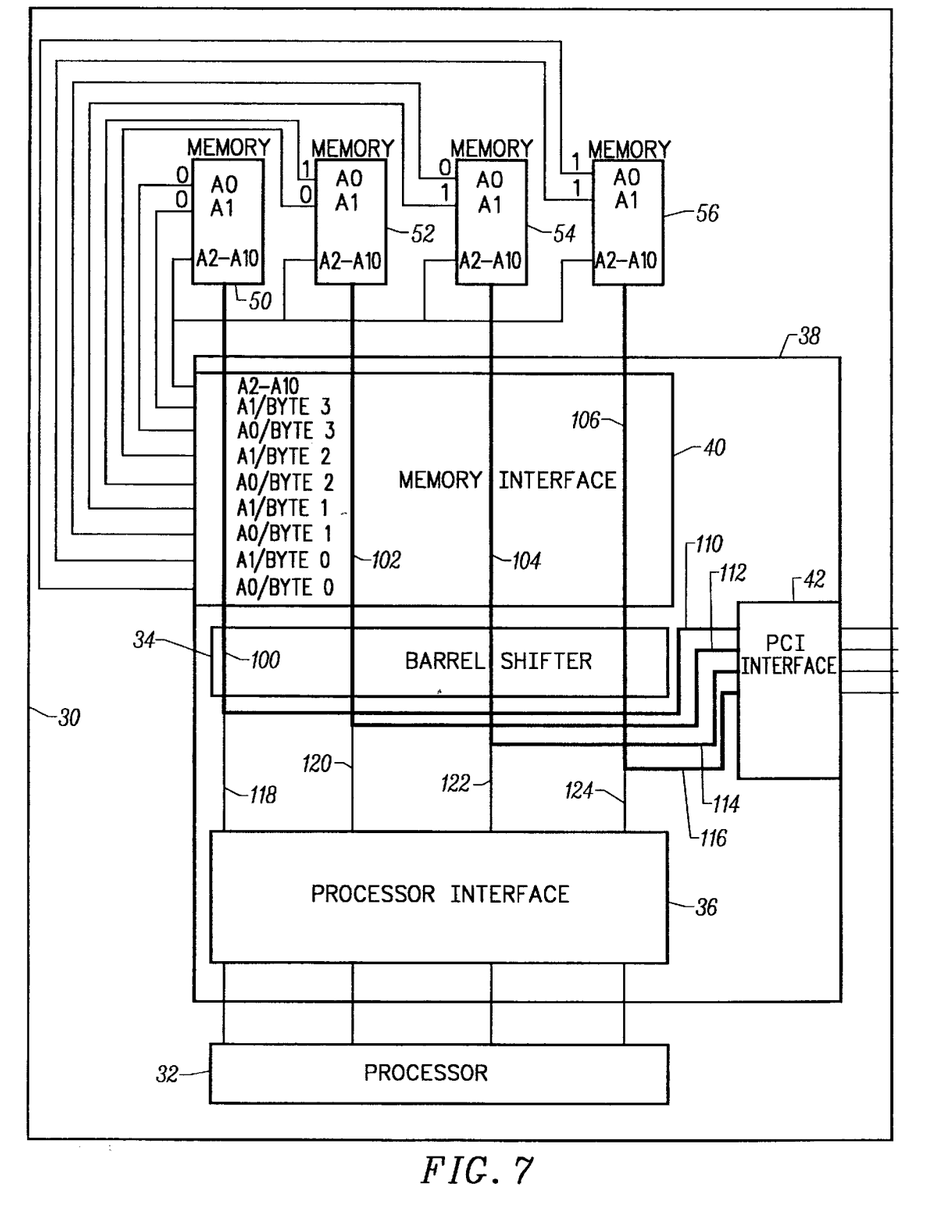
FIG. 7 is a block schematic diagram showing operation of a barrel shifter for a cyan color separation according to the invention.

FIG. 7 is a block schematic diagram showing operation of a barrel shifter 34 for a cyan color separation according to the invention. The following discussion is best understood if FIG. 6 is also consulted. In this example, the barrel shifter 34 does not shift the input data in accordance with the binary values on the memory selection lines. These values are shown on FIG. 7 as "00" at memory cell 50, "10" at memory cell 52, "01" at memory cell 54, and "11" at memory cell 56. Thus, byte $C_0$ from the first word 92, is transmitted on line 118 to the barrel shifter 34. The byte is output from the barrel shifter 34 on line 100 to memory cell 50. Byte $C_1$, from the second word 94, is transmitted on line 120 to the barrel shifter 34. The byte is output from the barrel shifter 34 on line 102 to memory cell 52. Similarly, byte $C_2$, from the third word 96, is transmitted on line 122 to the barrel shifter 34. The byte is output from the barrel shifter 34 on line 104 to memory cell 54. Byte $C_3$, from the fourth word 98, is transmitted on line 124 to the barrel shifter 34. The byte is output from the barrel shifter 34 on line 106 to memory cell 56. In this way, the cyan color plane is assembled from the chunky image data for output to the printer (e.g. via the PCI interface) in a planar format.

Figure 8:
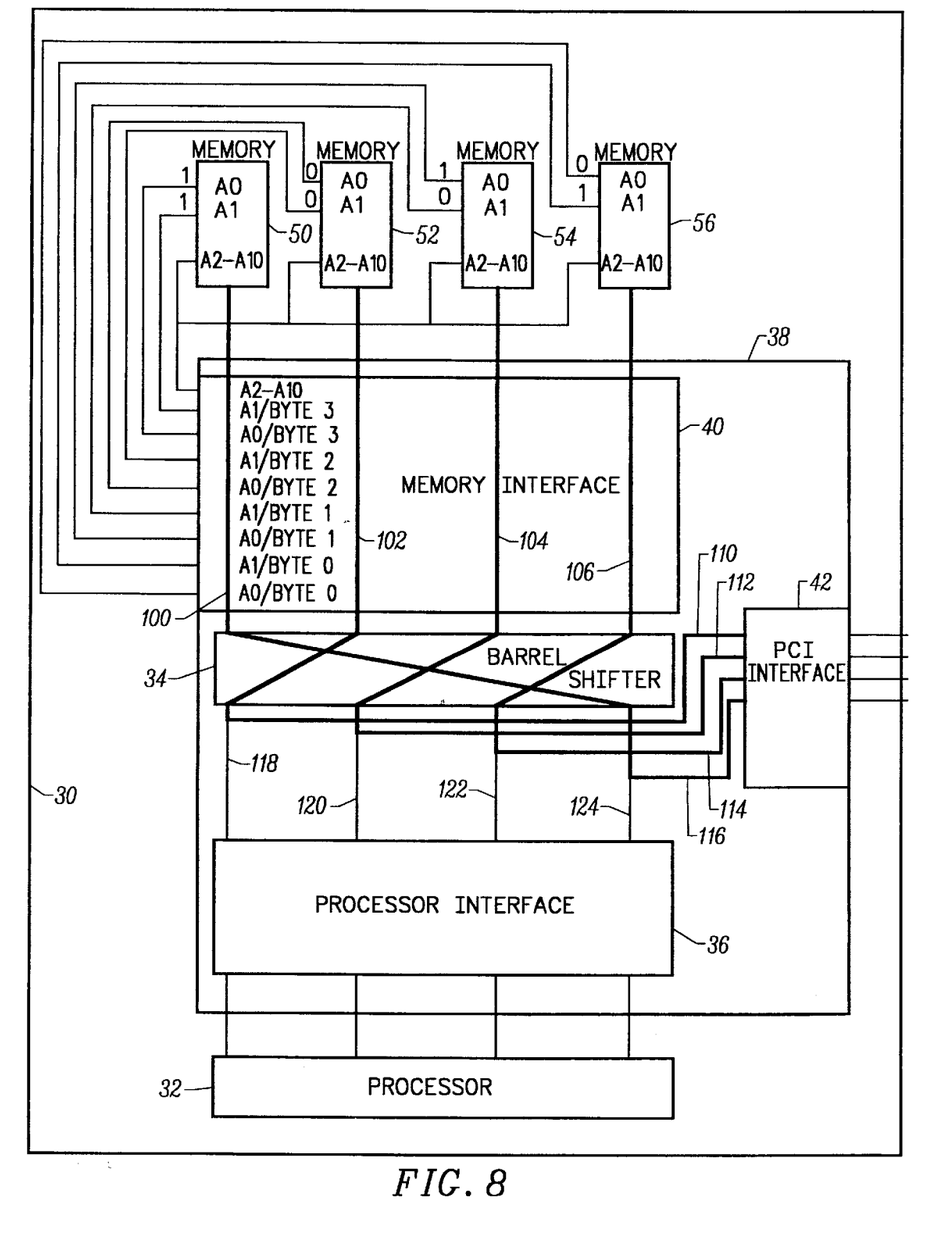
FIG. 8 is a block schematic diagram showing operation of a barrel shifter for a cyan color separation according to the invention.

FIG. 8 is a block schematic diagram showing operation of the barrel shifter 34 for a magenta color separation according to the invention. In FIG. 8, input data are shifted one position by the barrel shifter 34, as shown by the selection line values at memory cells 50 ("11", 52 ("00"), 54 ("10"), and 56 ("01"). Thus, byte $M_0$ from the first word 92 is transmitted on line 118 to the barrel shifter 34, and output from the barrel shifter 34 on line 102 to memory cell 52. Byte $M_1$ from the second word 94 is transmitted on line 120, and output from the barrel shifter 34 on line 104 for storage in memory cell 54. Byte $M_2$ from the third word 96 is transmitted on line 122, and output from the barrel shifter 34 on line 106 for storage in memory cell 56. Byte $M_3$ from the fourth word 98 is transmitted on line 124 to the barrel shifter 34, and output from on line 100 to memory cell 50.

Figure 9:
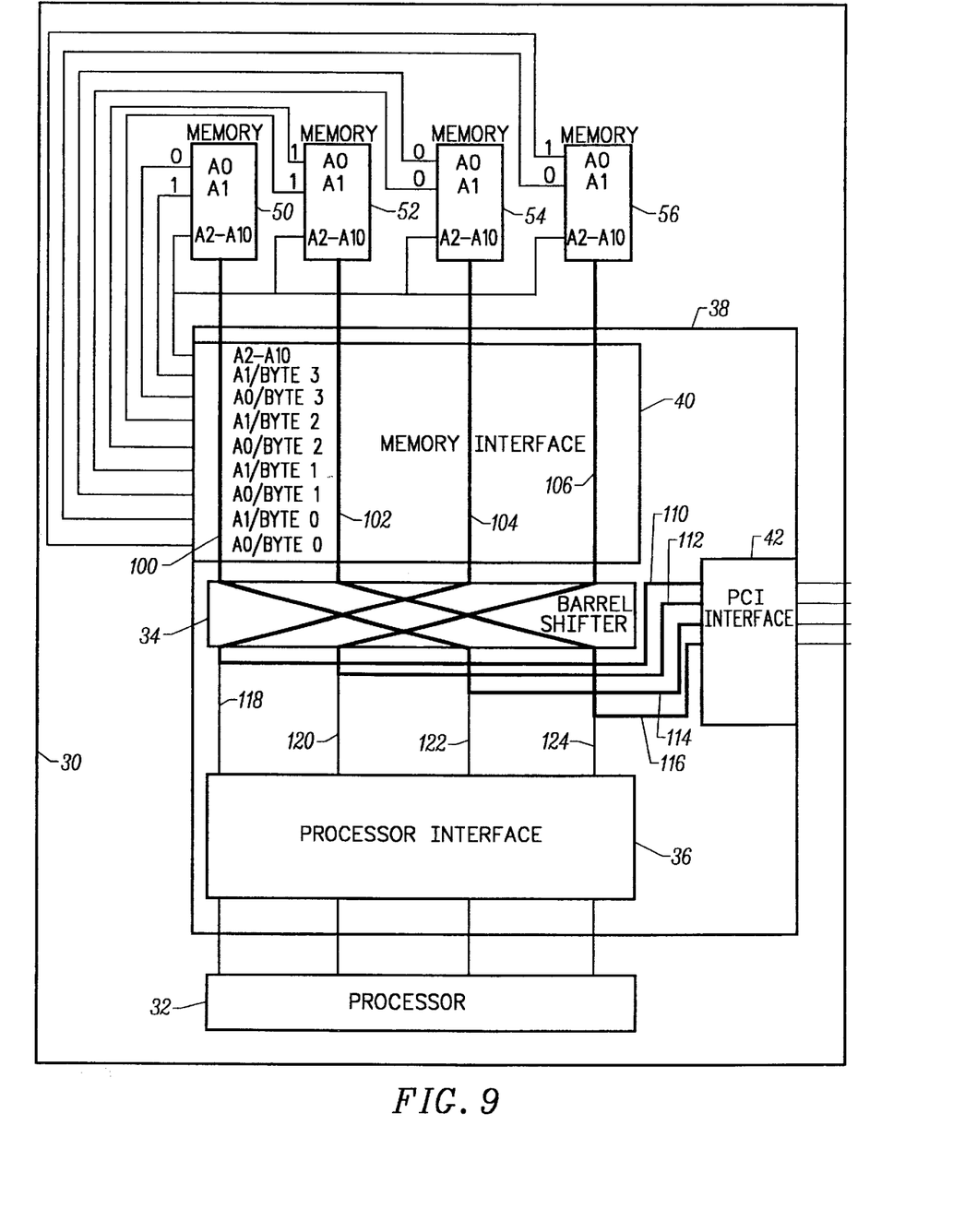
FIG. 9 is a block schematic diagram showing operation of a barrel shifter for a magenta color separation according to the invention.

FIG. 9 is a block schematic diagram showing operation of the barrel shifter 34 for a yellow color separation according to the invention. In FIG. 9, input data are shifted two positions by the barrel shifter 34, as shown by the selection line values at memory cells 50 ("01"), 52 ("11"), 54 ("00"), and 50 ("10"). Thus, byte $Y_0$ from the first word 92 is transmitted on line 118 to the barrel shifter 34, and output from the barrel shifter 34 on line 104 to memory cell 54. Byte $Y_1$, from the second word 94 is transmitted on line 120, and output from the barrel shifter 34 on line 106 for storage in memory cell 56. Byte $Y_2$ from the third word 96 is transmitted on line 122, and output from the barrel shifter 34 on line 100 for storage in memory cell 50. Byte $Y_3$ from the fourth word 98 is transmitted on line 124 to the barrel shifter 34, and output from on line 102 to memory cell 52.

Figure 10:
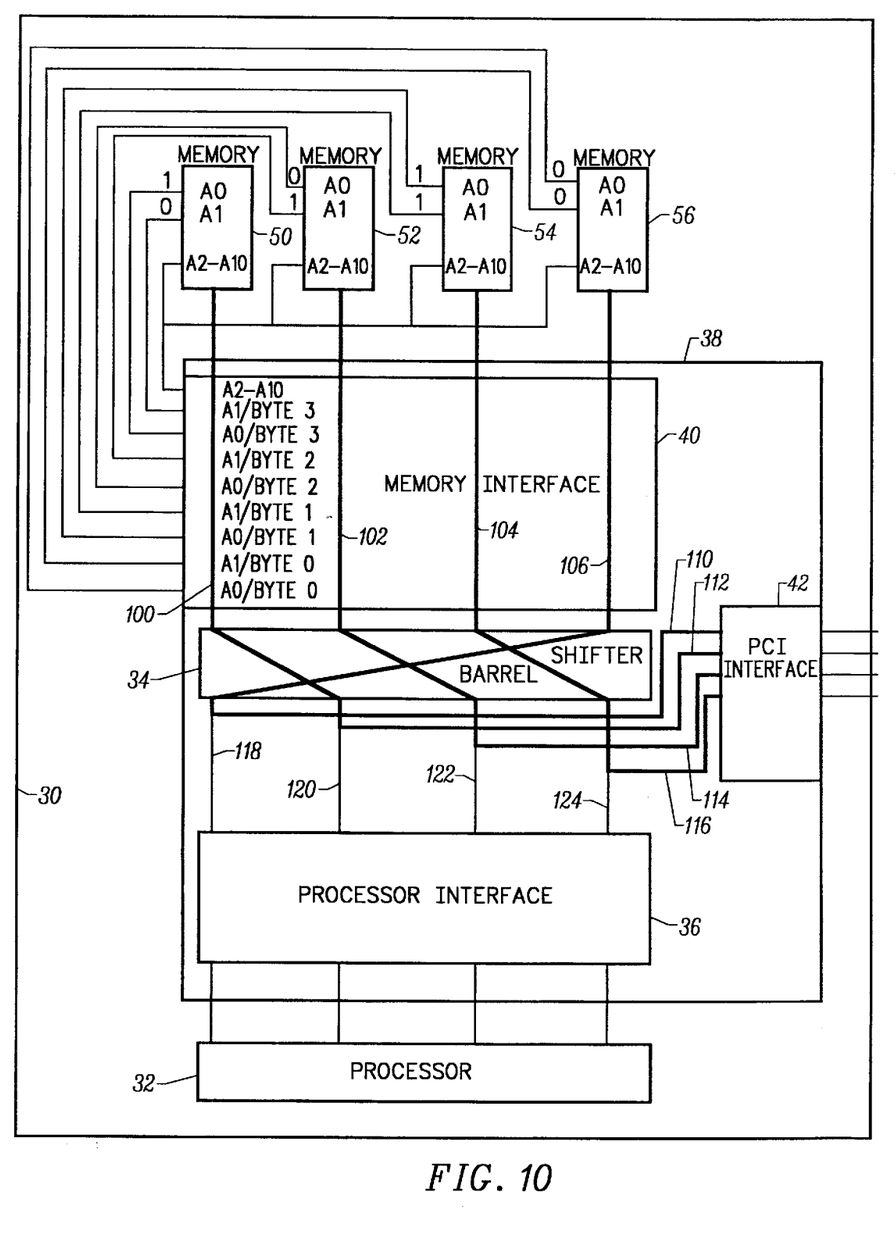
FIG. 10 is a block schematic diagram showing operation of a barrel shifter for a yellow color separation according to the invention.

FIG. 10 is a block schematic diagram showing operation of the barrel shifter 34 for a black color separation according to the invention. In FIG. 10, input data are shifted three positions by the barrel shifter 34, as shown by the selection line values at memory cells 50 ("10"), 52 ("01"), 54 ("11"), and 56 ("00"). Thus, byte $K_0$ from the first word 92 is transmitted on line 118 to the barrel shifter 34, and output from the barrel shifter 34 on line 106 to memory cell 56. Byte $K_1$ from the second word 94 is transmitted on line 120, and output from the barrel shifter 34 on line 100 for storage in memory cell 50. Byte $K_2$ from the third word 96 is transmitted on line 122, and output from the barrel shifter 34 on line 102 for storage in memory cell 52. Byte $K_3$ from the fourth word 98 is transmitted on line 124 to the barrel shifter 34, and output from the barrel shifter 34 on line 104 to memory cell 54.

It is often desirable to regenerate the chunky data structure from the color-sorted planar data. For example, the processor may need to override certain data. An alternative embodiment of the invention is provided that is bidirectionally operative and transparent to the processor. Thus, color-sorted bytes in planar format may be input from the print buffer to the barrel shifter 34. The barrel shifter 34 is then used to sort the planar bytes to output the image data in a chunky format. This is readily accomplished, for example, by reconfiguring the memory cell select lines accordingly.

Although the invention is described herein with reference to the preferred embodiment, one skilled in the art will readily appreciate that other applications may be substituted for those set forth herein without departing from the spirit and scope of the present invention. Thus, the invention may be used with any color conversion scheme that generates a CMYK image. For example, the invention may be used when the image is rendered from a HSV (hue, saturation, value) color cone image or an RGB image to a CMYK image. Accordingly, the invention should only be limited by the claims included below.

What is claimed is:

1. A method for converting a continuous tone image between a chunky format and a planar format, the method comprising:
    providing a plurality of memory cells having at least one interconnected address for receiving bytes;
    receiving the continuous tone image comprising bytes in a chunky format;
    separating each of the bytes of the received continuous tone image by color plane with a barrel shifter;
    storing each of the separated bytes in the plurality of memory cells; and
    separately outputting the separated bytes of each color plane from the barrel shifter to provide planar format continuous tone image data.

2. The method of claim 1, further comprising:
    rendering the image in chunky data format in a processor; and
    transmitting the chunky data over the processor's bus to the barrel shifter.

3. The method of claim 1, wherein each of the memory cells includes at least two addresses that are not interconnected to the addresses of other of the memory cells.

4. The method of claim 3, wherein the barrel shifter separates the chunky format image data in accordance with binary values provided at the at least two non interconnected addresses of the memory cells.

5. The method of claim 4, wherein the barrel shifter outputs cyan bytes when the barrel shifter does not shift byte position in response to the binary values.

6. The method of claim 4, wherein the barrel shifter outputs magenta bytes when the barrel shifter shifts bytes one position in response to the binary values.

7. The method of claim 4, wherein the barrel shifter outputs yellow bytes when the barrel shifter shifts bytes two positions in response to the binary values.

8. The method of claim 4, wherein the barrel shifter outputs black bytes when the barrel shifter shifts bytes three positions in response to the binary values.

9. The method of claim 1, further comprising:
    inputting in planar format to the barrel shifter the separated bytes of each color; and
    using the barrel shifter to separate the bytes to output the image in chunky format.

10. A method for converting a continuous tone image between a chunky format and a planar format, comprising:
    providing a barrel shifter;
    providing a plurality of memory cells each having at least first and second addresses that are not interconnected to implement byte shifting in accordance with the barrel shifter, and at least a third common address to receive bytes;
    receiving a continuous tone image comprising bytes in a chunky format;
    transmitting the continuous tone image to the barrel shifter;
    using the barrel shifter to separate each of the bytes of the received continuous tone image by color plane;
    separately outputting the separated bytes of each color plane from the barrel shifter; and storing each of the separated bytes of each color plane in planar format in the at least third common address of the plurality of memory cells.

11. The method of claim 10, wherein the number of positions shifted by the barrel shifter is determined by binary values stored in the memory addresses of the memory cells that are not interconnected.

12. The method of claim 11, wherein the barrel shifter outputs cyan bytes when the barrel shifter does not shift byte position in response to the binary values.

13. The method of claim 11, wherein the barrel shifter outputs magenta bytes when the barrel shifter shifts one byte position in response to the binary values.

14. The method of claim 11, wherein the barrel shifter outputs yellow bytes when the barrel shifter shifts two byte positions in response to the binary values.

15. The method of claim 11, wherein the barrel shifter outputs black bytes when the barrel shifter shifts three byte positions in response to the binary values.

16. The method of claim 10, further comprising the steps of:

inputting in planar format to the barrel shifter the separated bytes of each color plane; and using the barrel shifter to sort the bytes to output the image in chunky format.

17. A system for converting a continuous tone image between a chunky format and a planar format, comprising:

a barrel shifter for separating by color plane each of the bytes of each of the words of the chunky format continuous tone image and for outputting the separated bytes in planar format; and a plurality of memory cells each having at least first and second addresses that are not interconnected to implement byte shifting in accordance with the barrel shifter and at least a third common address to receive each of the output bytes of each of the words in planar format from the barrel shifter.

18. The system of claim 17, wherein the barrel shifter outputs cyan bytes when the barrel shifter does not shift byte position in response to the binary values;

wherein the barrel shifter outputs magenta bytes when the barrel shifter shifts one byte position in response to the binary values;

wherein the barrel shifter outputs yellow bytes when the barrel shifter shifts two byte positions in response to the binary values; and wherein the barrel shifter outputs black bytes when the barrel shifter shifts three byte positions in response to the binary values.

19. The system of claim 17, wherein the barrel shifter is bidirectionally operable to receive the separated bytes in planar format and to sort the bytes to output the image in chunky format.

* * * * *